Patented Oct. 4, 1938

2,132,031

UNITED STATES PATENT OFFICE 2,132,031

PROCESS OF TREATING SULPHIDE ORES

Noak Victor Hybinette, Jackson, Mich.

No Drawing. Application October 19, 1934, Serial No. 749,045. Renewed July 14, 1937

7 Claims. (Cl. 75—11)

This invention relates to the metallurgical treatment of ores containing large quantities of iron and sulphur and which may or may not contain copper, nickel, cobalt, zinc, precious metals, etc.

The principal object is to recover sulphur and iron, although other heavy metals that may be present in the ore are recovered at the same time.

Another object is to recover from such ores iron in combination with nickel.

The raw material may be a straight pyrite without any other heavy metals or it may be any mixed sulphide ores of pyrites, chalcopyrite, pyrrhotite, pentlandite, etc.

The ore to be treated may contain so much barren rock that it may have to be concentrated because my raw material should not contain more than 10 to 15 per cent barren rock and preferably less.

My process consists of roasting the ore in an oxidizing or a sulphatizing roast with or without the addition of sodium sulphate, or the like. The main part of the sulphur is thereby removed as sulphur dioxide. This gas is piped to the sulphur reduction plant where it is reduced to free sulphur by carbon monoxide gas produced as hereinafter described. The roasted ore is leached, if necessary, and mixed with sodium chloride, given a chloridizing roasting, leached, and copper, nickel, cobalt, zinc, precious metals, etc., are separated in any known manner, leaving a residue of iron oxide which may or may not contain some nickel depending on the original ore used. Such iron oxide is briquetted, or sintered, mixed with coke and reduced to metallic iron in an electric furnace so arranged and so operated that sufficient quantities of carbon monoxide gas are produced to be used in reducing the sulphur dioxide produced by the original roasting. In order to obtain sufficient carbon monoxide there will sometimes be necessitated the reduction in the electric furnace of more iron oxide than is derived from the roasting, leaching and separating of the ore. In the case of pyrrhotite, chalcopyrite, etc., constituting the ore, such use of additional iron ore is not necessary but in the case of iron pyrite it may be. Should such addition of iron ore be impossible for economic reasons, additional carbon monoxide can always be obtained by passing the final residue gas after treatment with carbon monoxide and removal of the sulphur, through a mass of red hot coke whereby the carbon dioxide from the residue is reduced to carbon monoxide.

It will be seen that my main invention consists in combining a sulphur dioxide reduction with an electric furnace reduction of the iron oxide. This combination provides a highly efficient arrangement for producing iron and sulphur. The carbon monoxide coming from the electric furnace is very concentrated and pure. On the other hand I make good use of the carbon monoxide coming from the electric furnace which otherwise might be wasted and am thereby able to work very economically. An item of great importance is that the cast iron produced from a nickel-copper ore will contain whatever nickel and cobalt is left in the residue after leaching and the slag losses of ordinary standard practice smelting operations are avoided. By variations of the chloridizing roasting I am able to extract a greater or smaller portion of the nickel, but it is necessary to remove copper and precious metals by chloridizing roasting and leaching and the bulk of the nickel is thereby extracted at the same time.

I have purposely not described the details of sulphur separation and the recovery of copper, nickel, cobalt and precious metals from the solutions. All these are steps well known to the trained metallurgist and can be brought about by known processes.

In the claims, by the stating that heavy metals are recovered from the roasted ore residues I want it understood that the percentage of recovery is commercial only. Further, by the word ores, both in the specification and in the claims, I mean not only natural ores but also concentrates and furnace products.

Having thus described my invention what I claim and desire to secure by Letters Patent is:

1. The process of recovering sulphur and iron from ores containing large quantities of iron and sulphur which comprises roasting the ore to remove the sulphur as a gas, mainly consisting of sulphur dioxide, smelting the residue with coke in an electric furnace and using the by-product carbon monoxide from such smelting for the reduction of said sulphur dioxide to obtain free sulphur, and recovering said free sulphur.

2. The process of recovering sulphur and iron from sulphide ores which comprises roasting the ore to remove the sulphur as a gas, mainly consisting of sulphur dioxide, recovering the non-ferrous metals from the residue after roasting by chloridizing roasting, and leaching, smelting such purified residue with coke in an electric furnace, and using the by-product carbon monoxide from such smelting for the reduction of the said sulphur dioxide.

3. The process of recovering sulphur and iron from ore which comprises the steps of treating the ore to remove the sulphur as sulphur dioxide gas, smelting the residue in the presence of a carbonaceous material in a furnace and in a manner to produce carbon monoxide gas, and using the carbon monoxide gas from said smelting step for the reduction of said sulphur dioxide gas to obtain free sulphur.

4. As a step in the treatment of ore containing sulphur and iron, the association of roaster gas containing sulphur dioxide and carbon monoxide gas produced by the smelting of the residue ore from the roaster in the presence of a carbonaceous material whereby free sulphur is obtained.

5. The process of recovering sulphur and iron from sulphide ores which comprises roasting the ore in the presence of sodium sulphate to remove the sulphur as a gas, mainly consisting of sulphur dioxide, leaching out the sulphates and recovering the remaining non-ferrous metals from the residue by chloridizing roasting and leaching, smelting such purified residue with coke in an electric furnace, and using the by-product carbon monoxide from such smelting for the reduction of the said sulphur dioxide.

6. The process of recovering sulphur and iron from ores containing large quantities of iron and sulphur which comprises roasting the ore to remove the sulphur as a gas, mainly consisting of sulphur dioxide, smelting the residue with coke in an electric furnace to produce iron and carbon monoxide, and reacting said carbon monoxide in excess with said sulphur dioxide for the production of free sulphur.

7. The process of recovering sulphur and iron from ores containing large quantities of iron and sulphur which comprises roasting the ore to remove the sulphur as a gas, mainly consisting of sulphur dioxide, recovering any non-ferrous metals present from the residue after roasting, by chloridizing roasting, and leaching, smelting such purified residue with coke in an electric furnace, and using the by-product carbon monoxide from said smelting for the reduction of said sulphur dioxide.

NOAK VICTOR HYBINETTE.